(12) United States Patent
Ozeki

(10) Patent No.: US 6,532,939 B2
(45) Date of Patent: Mar. 18, 2003

(54) FUEL INJECTOR FIXING STRUCTURE FOR USE WITH AN IN-CYLINDER INJECTION TYPE ENGINE

(75) Inventor: Hisashi Ozeki, Hamamatsu (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 0 days.

(21) Appl. No.: 09/842,709

(22) Filed: Apr. 27, 2001

(65) Prior Publication Data

US 2001/0042539 A1 Nov. 22, 2001

(30) Foreign Application Priority Data

May 22, 2000 (JP) ........................................ 2000-149654

(51) Int. Cl.[7] .............................................. F02M 55/00
(52) U.S. Cl. ....................................... 123/470; 123/469
(58) Field of Search ................................. 123/468, 469, 123/470, 456

(56) References Cited

U.S. PATENT DOCUMENTS

| | | | | |
|---|---|---|---|---|
| 3,038,456 A | * | 6/1962 | Dreisin ........................ 123/470 |
| 3,695,235 A | * | 10/1972 | Anderson ................. 239/533.1 |
| 4,133,321 A | * | 1/1979 | Hofmann et al. ........... 123/470 |
| 4,203,402 A | * | 5/1980 | Freyn .......................... 123/470 |
| 4,206,725 A | * | 6/1980 | Jenkel et al. ................ 123/470 |
| 6,073,612 A | * | 6/2000 | Ohkubo et al. ............. 123/456 |
| 6,148,797 A | * | 11/2000 | Gmelin ........................ 123/456 |
| 6,318,341 B1 | * | 11/2001 | Gmelin et al. .............. 123/456 |
| 6,338,333 B1 | * | 1/2002 | Brosseau et al. ........... 123/456 |

* cited by examiner

Primary Examiner—Henry C. Yuen
Assistant Examiner—Arnold Castro
(74) Attorney, Agent, or Firm—Nath & Associates PLLC; Gary M. Nath; Marvin C. Berkowitz

(57) ABSTRACT

A fuel injector fixing structure for use with an in-cylinder injection type engine is improved to reduce the number of processing man-hours and the number of parts as well as the number of assembling man-hours. In detail, each fuel injector is inserted into an injector fixing hole of a cylinder head, followed by attaching an injector fixing bracket. Then, each connecting portion of a fuel delivery pipe is connected to a fuel inlet of each fuel injector, followed by inserting a common bolt through an fixing boss portion and an injector fixing bracket, and fixing these elements to a common boss portion of the cylinder head. In this way, each fuel injector and the fuel delivery pipe can be fixed in the cylinder head by virtue of a common bolt, thereby making it possible to reduce the number of processing man-hours and the number of parts as well as the number of assembling man-hours.

6 Claims, 8 Drawing Sheets

FUEL INJECTOR FIXING STRUCTURE FOR USE WITH AN IN-CYLINDER INJECTION TYPE ENGINE

BACKGROUND OF THE INVENTION

1. Field of the Invention

The present invention relates to a fuel injector fixing structure for use with an in-cylinder injection type engine in which a fuel (gasoline) is directly injected into cylinders of the engine.

2. Description of the Related Art

With regard to an internal combustion engine installed within an automobile or the like, there has been known an in-cylinder injection type engine which is so formed that an injection nozzle of a fuel injector is disposed in a combustion chamber, a fuel is directly injected into an air introduced from an intake port into cylinders, thereby producing a mixed gas for a desired combustion. Here, the in-cylinder injection type engine enables a stratified charge combustion and also expands a capacity to control a fuel combustion for regulating a running by managing a fuel injection amount. Accordingly, such an in-cylinder injection type engine has been noticed through the public as an internal combustion engine effectively improving a fuel economy in actual traffic and purifying an exhaust gas.

In general, an in-cylinder injection type engine is formed in such a manner that each cylinder head is provided with a boss to fix a fuel injector and another boss to fix a fuel delivery pipe for supplying a fuel to the fuel injector whereby the fuel injector and the fuel delivery pipe are fixed to different bosses with different bolts.

As described above, since each cylinder head is required to be provided with two different bosses in order to fix the fuel injector and the fuel delivery pipe respectively, there has been a problem that the number of processing man-hours, the number of parts and the number of assembling man-hours are all relatively increased.

SUMMARY OF THE INVENTION

The present invention has been accomplished in the light of the above problem, and the object of the invention is to provide an improved fuel injector fixing structure for use with an in-cylinder injection type engine so as to reduce the number of processing man-hours and the number of parts as well as the number of assembling man-hours.

In order to solve the above problem, the present invention provides an improved fuel injector fixing structure for use with an in-cylinder injection type engine equipped with fuel injectors directly injecting a fuel into cylinders, characterized in that: a fuel delivery pipe supplying a fuel to the fuel injectors and each injector fixing bracket for fixing the fuel injector are jointly fastened to a boss portion of a cylinder head with a common bolt.

Accordingly, each fuel injector and the fuel delivery pipe with the above construction are fixed to the cylinder head with a common bolt.

Further, the fuel injector fixing structure for use with the in-cylinder injection type engine is characterized in that a fuel passage of the fuel delivery pipe is provided between the axes of both each fuel injector and each bolt.

Accordingly, the fuel passage with the above construction favorably reduces interferes with other parts such as an intake port.

Moreover, the fuel injector fixing structure for use with an in-cylinder injection type engine is characterized in that each fixing boss portion wherein the bolt of the fuel delivery pipe is inserted is positioned higher in its axial direction than a corresponding fuel injector.

With the above construction, each fuel injector can be satisfyingly protected by virtue of a corresponding fixing boss portion of the fuel delivery pipe.

Furthermore, the fuel injector fixing structure for use with an in-cylinder injection type engine is characterized in the above constructions that an electric connector of each fuel injector is surrounded by the fuel delivery pipe's connecting portion and two fixing boss portions all provided for connection with a fuel injector.

With the above construction, the electric connector of each fuel injector can be protected by virtue of the fuel delivery pipe's connecting portion and two fixing boss portions all provided for connection with a fuel injector.

DESCRIPTION OF THE PREFERRED EMBODIMENTS

Figure 1:
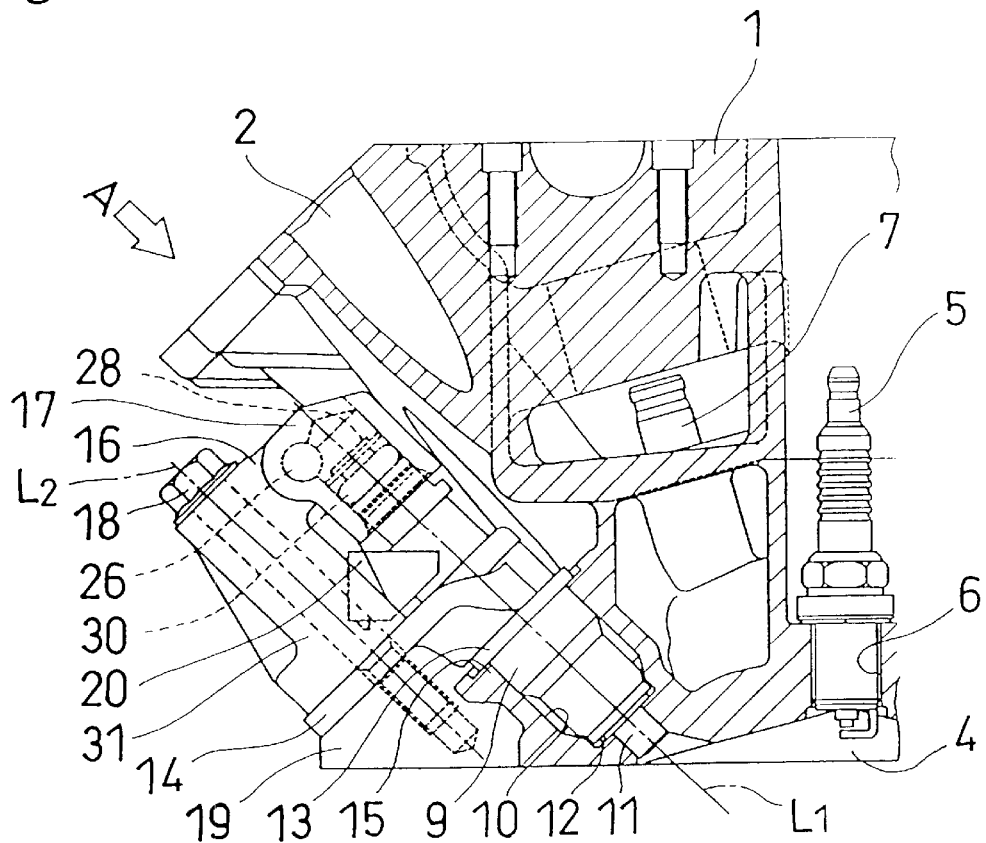
FIG. 1 is a longitudinally sectional view schematically showing an important portion of a cylinder head containing a fuel injector fixing structure formed according to one embodiment of the present invention.
Figure 2:
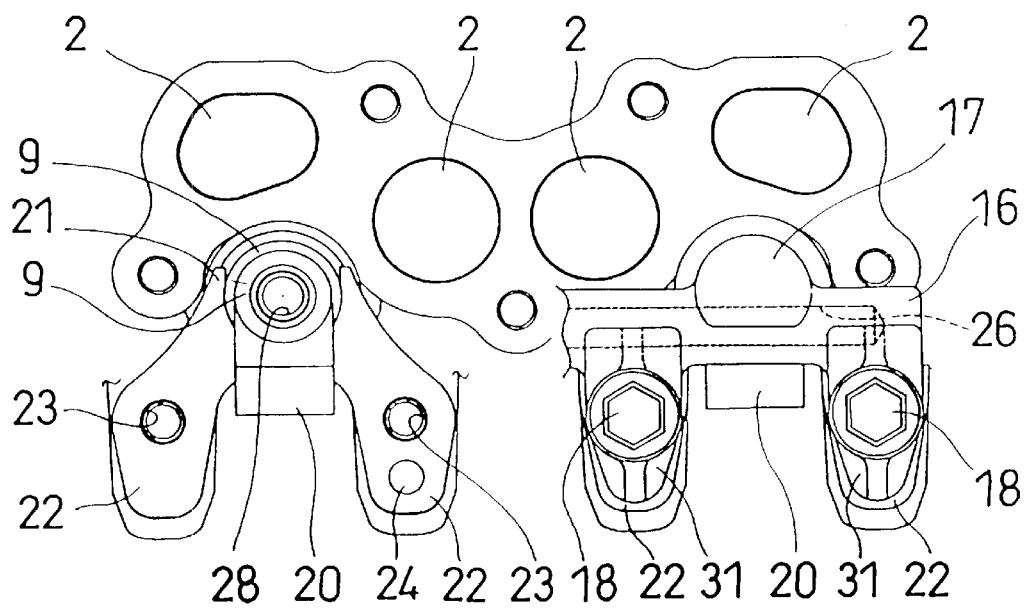
FIG. 2 is a view seen in A direction of FIG. 1, which is formed by partially cutting the fuel delivery pipe of an apparatus shown in FIG. 1.
Figure 3:
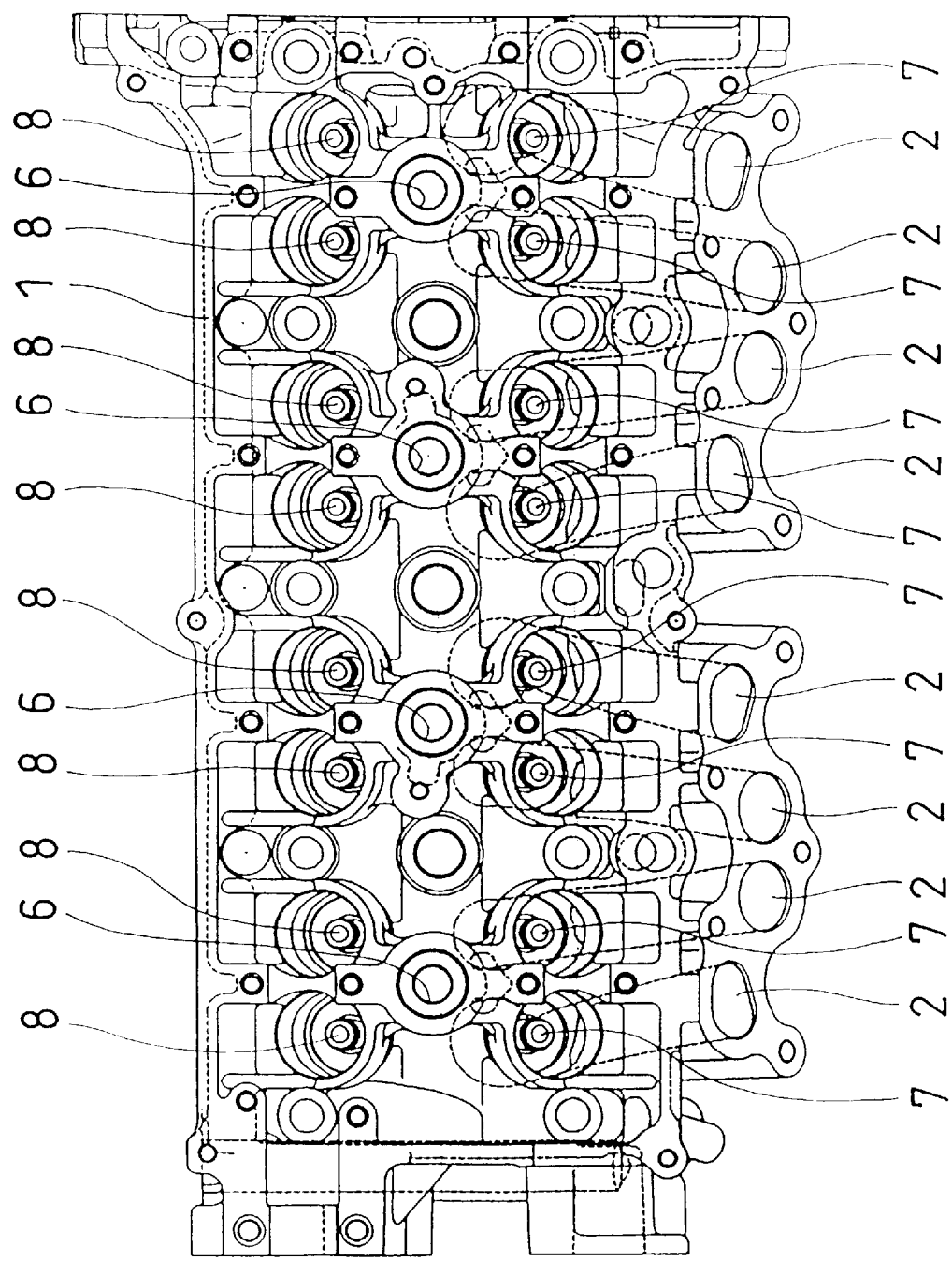
FIG. 3 is a plan view schematically indicating cylinder heads of the apparatus shown in FIG. 1.
Figure 4:
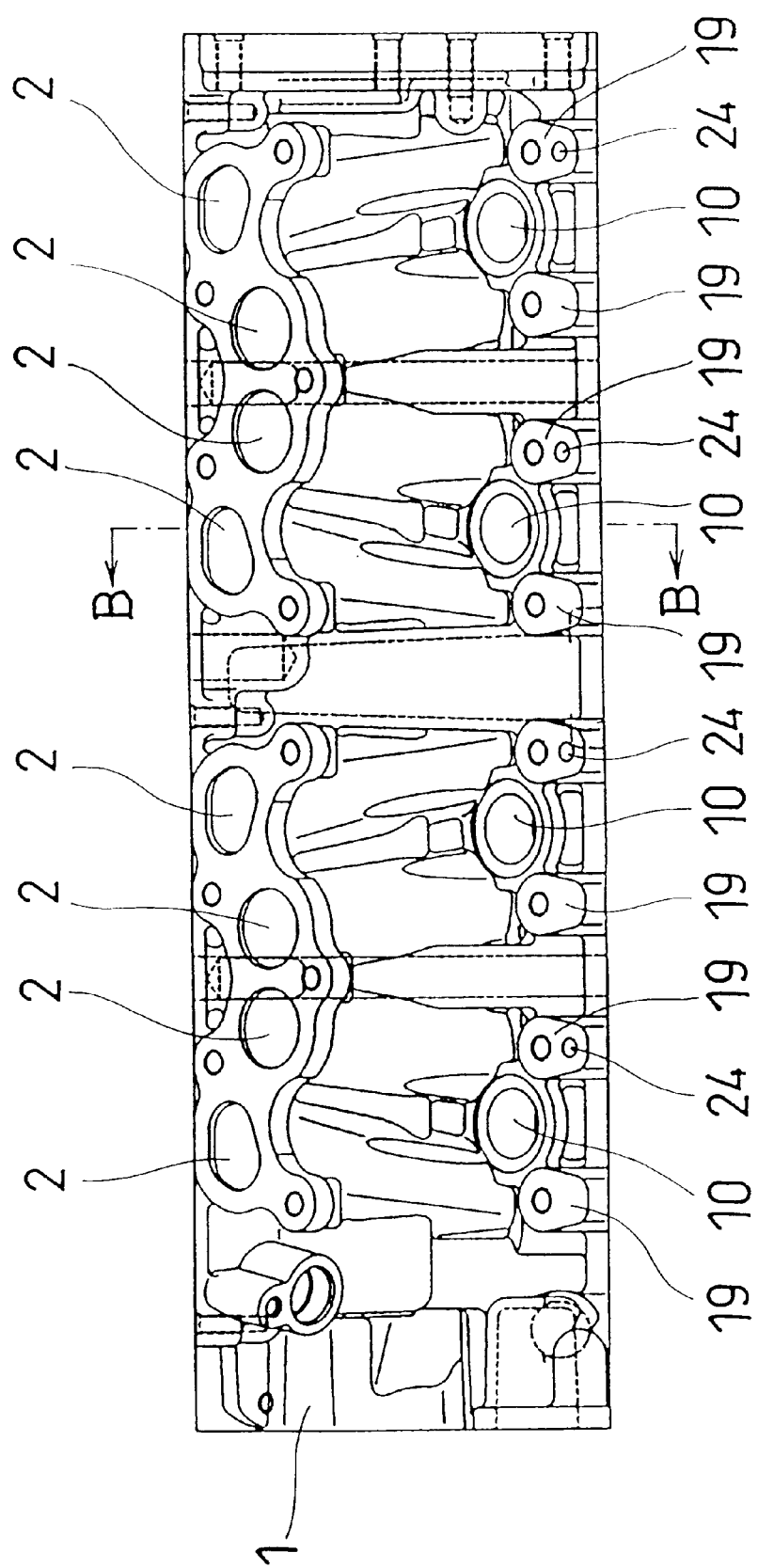
FIG. 4 is a side view schematically showing the inlet side of each intake port of each cylinder head shown in FIG. 3.
Figure 5:
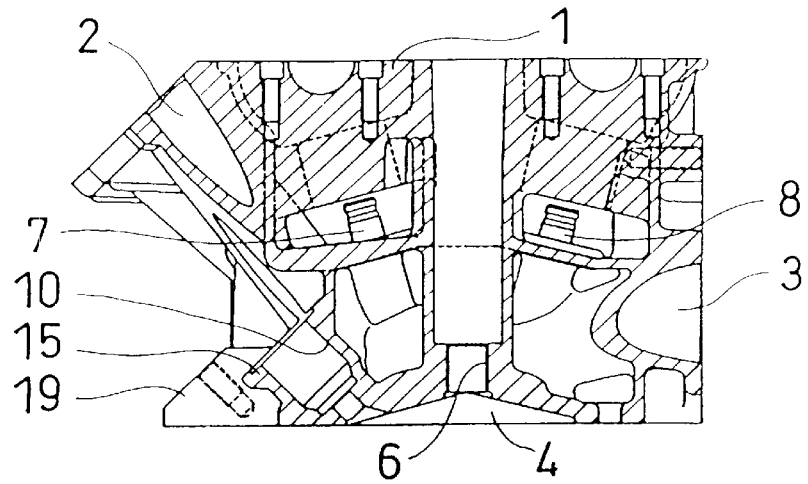
FIG. 5 is a longitudinally sectional view taken along B—B line in FIG. 4.
Figure 6:
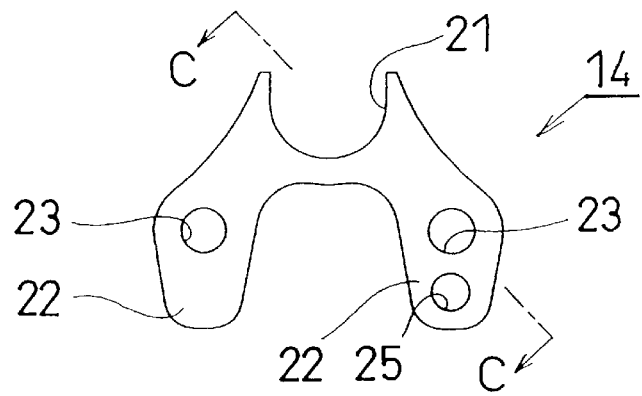
FIG. 6 is a front view schematically showing an injector fixing bracket of the apparatus of FIG. 1.
Figure 7:
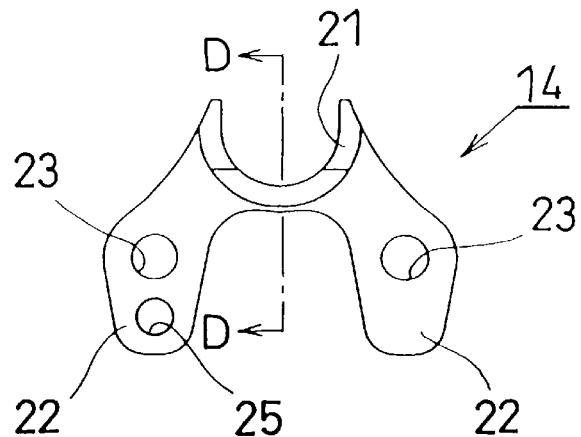
FIG. 7 is a back view schematically showing the injector fixing bracket of FIG. 6.
Figure 8:
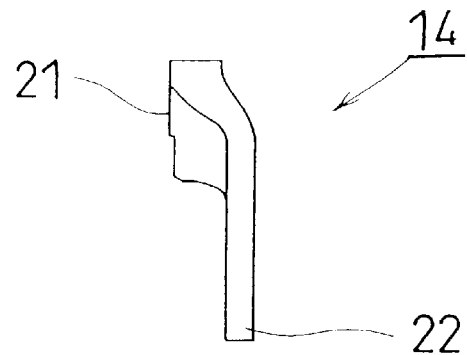
FIG. 8 is a side view schematically showing the injector fixing bracket of FIG. 6.
Figure 9:
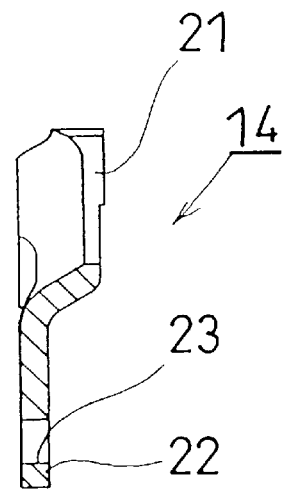
FIG. 9 is a cross sectional view taken along C—C line in FIG. 6.
Figure 10:
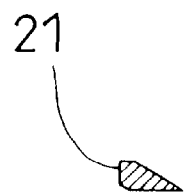
FIG. 10 is a cross sectional view taken along D—D line in FIG. 7.
Figure 11:
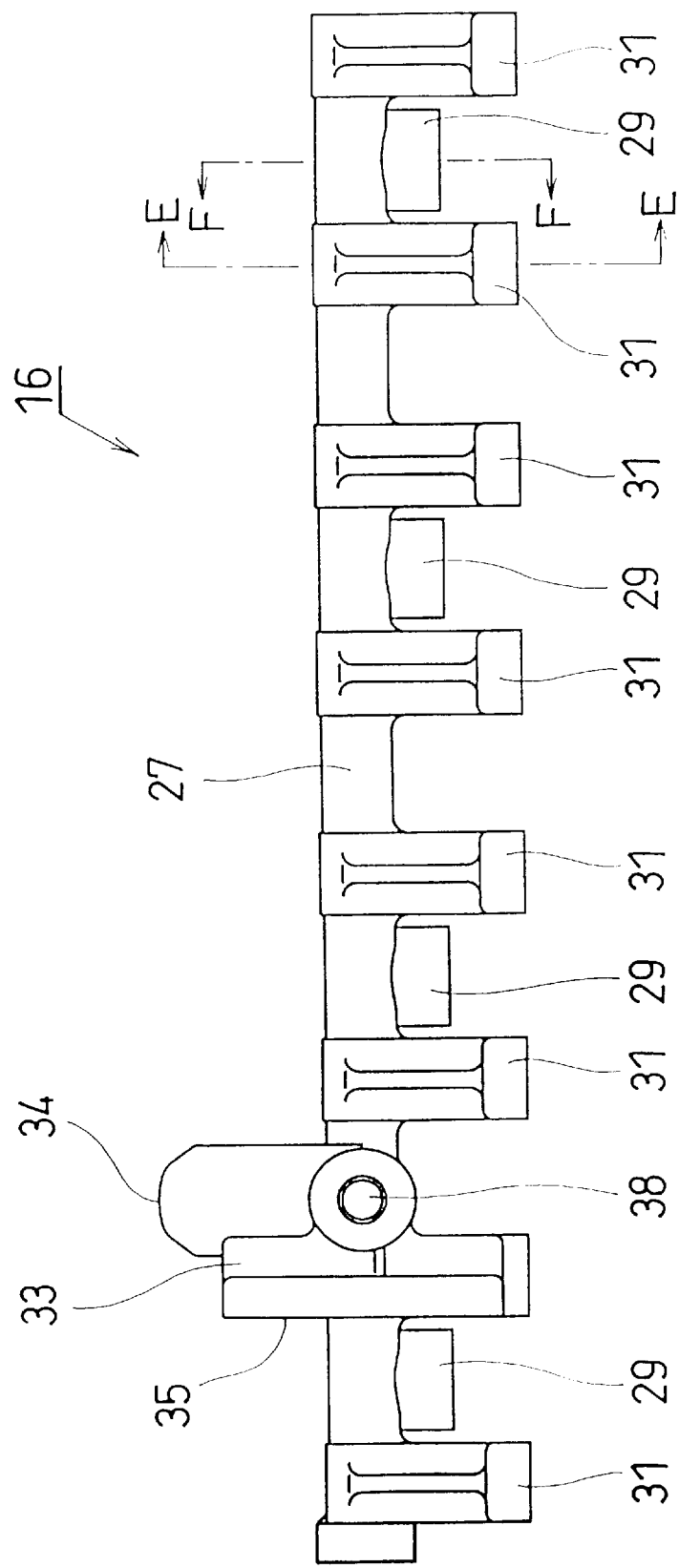
FIG. 11 is a front view schematically showing the fuel delivery pipe of the apparatus of FIG. 1.
Figure 12:
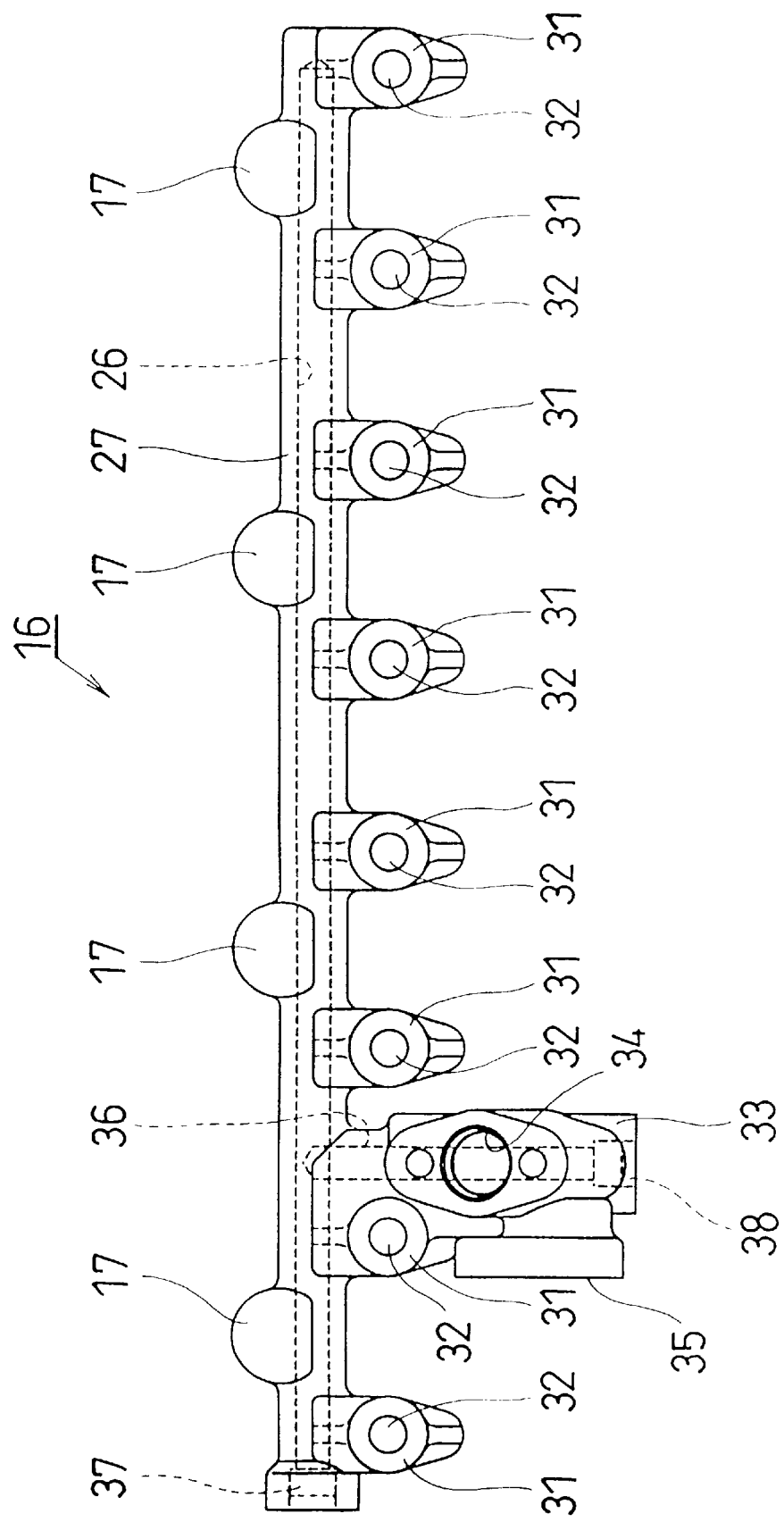
FIG. 12 is a plan view schematically showing the fuel delivery pipe of FIG. 11.
Figure 13:
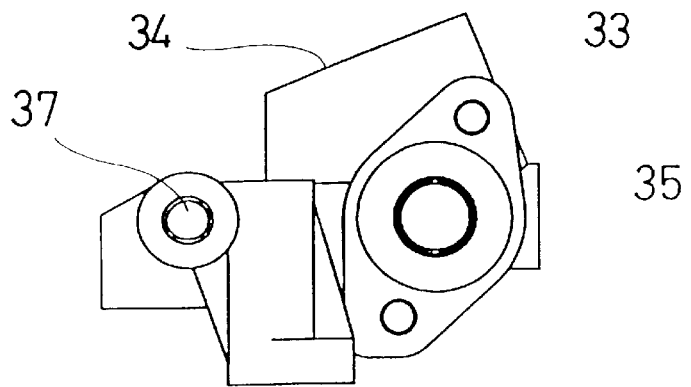
FIG. 13 is an end view schematically showing a connecting boss of the fuel delivery pipe of FIG. 11.
Figure 14:
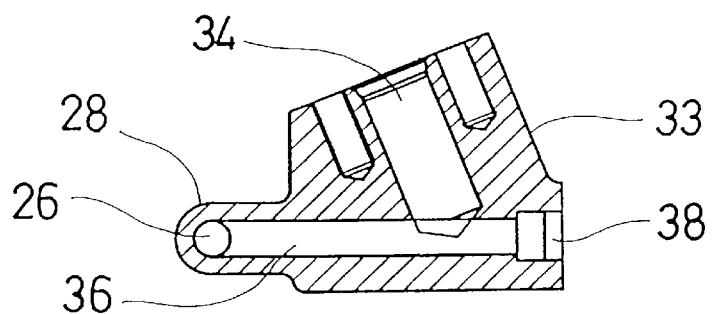
FIG. 14 is a longitudinally sectional view showing the connecting boss of FIG. 13.
Figure 15:
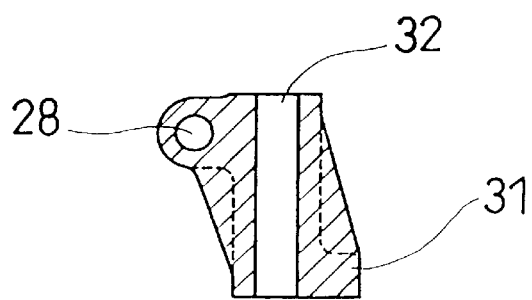
FIG. 15 is a longitudinally sectional view taken along E—E line in FIG. 11.
Figure 16:
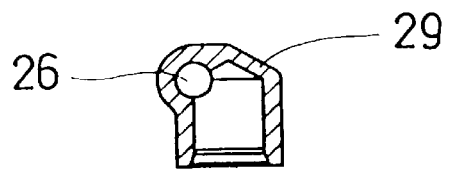
FIG. 16 is a longitudinally sectional view taken along F—F line in FIG. 11.

An embodiment of the present invention will be hereinafter described with reference to the accompanying drawings.

FIGS. 1 to 5 illustrate a cylinder head 1 of an in-cylinder injection type gasoline engine according to the present embodiment. As shown in the drawings, the engine is a serial 4-cylinder DOHC (Double Overhead Cam Shaft) type engine. The cylinder head 1 is so formed that each cylinder is provided with two intake ports 2 and two exhaust ports 3 (refer to FIG. 5), and there is formed a pent roof type combustion chamber 4 whose central area is formed with an ignition plug fixing hole 6 for fixing an ignition plug 5 (refer to FIG. 1). In the drawings, reference numerals 7 and 8 denote valve guides for guiding an intake valve (not shown) and an exhaust valve (not shown), respectively.

Further, the cylinder head 1 is provided with an injector fixing hole 10 for fixing a fuel injector 9 so as to face the combustion chamber 4. The injector fixing hole 10 is located under a position between the two intake ports 2 and extends substantially parallel to the intake ports 2. The fuel injector 9 is installed into the injector fixing hole 10 through a waveform gasket 12 so as to make the injection nozzle 11 faced toward the combustion chamber 4, so that a flange portion 13 is pressed by and fixed on a boss portion 15 of the cylinder head 1 with an injector fixing bracket 14.

And, the cylinder head 1 is equipped with four fuel injectors 9 each of which is connected with a connecting portion 17 of a fuel delivery pipe 16. The fuel delivery pipe 16 is fixed in a boss portion 19 of the cylinder head 1 with a bolt 18 together with the injector fixing bracket 14. In the drawings, reference numeral 20 denotes an electric connector of the fuel injector 9.

As shown in FIGS. 6 to 10, the injector fixing bracket 14 is so formed that its connecting portions 22 extend from a generally U-shaped engaging portion 21 for engaging with the flange portion 13 of the fuel injector 9, thereby forming a fork-like configuration. Specifically, the connecting portions 22 are adapted to connect with the boss portions 19 formed on both sides of the injector fixing hole 10 of the cylinder head 1. Here, the connecting portions 22 forming a fork-like configuration are constructed in such a manner that each of them has a bolt hole 23 permitting a bolt 18 to be inserted therethrough. In particular, one of the connecting portions 22 is formed with a pin hole 25 permitting the insertion of a positioning pin 24 protruding from one of the boss portions 19.

Further, as shown in FIGS. 11 to 16, the fuel delivery pipe 16 is formed with a plurality of cap-like connecting portions 17 which are arranged on one side of the pipe main body 27 having a fuel passage 26 extending along an arrangement of four cylinders of the engine, in such a manner that each cap-like connecting portion is rendered to face towards a fuel inlet 28 provided on one end of a fuel injector 9 of the cylinder head 1. Further, each connecting portion 17 is externally attached through an O-ring 30 to a corresponding fuel inlet 28 of a fuel injector 9, thereby communicating the fuel passage 26 with each fuel inlet 28.

On the other side of the pipe main body 27, there are provided a plurality of fixing boss portions 31 facing toward the boss portions 19 of the cylinder head 1, and each of the fixing boss portions 31 has a bolt hole 32 permitting a bolt 18 to be inserted, and can be connected to a boss portion 19 of the cylinder head 1 together with an injector fixing bracket 14.

Then, as shown in FIG. 1, the fuel passage 26 is disposed between the axis $L_1$ of the fuel injector 9 and the axis $L_2$ of the bolt 18. Further, the upper portion of each of the fixing boss portions 31 is formed relatively higher in its position to the fuel inlet 28 formed on one end of the fuel injector 9 when considering the axis $L_1$ of the fuel injector 9 and the axis $L_2$ of the bolt 18 as a baseline.

Furthermore, on the other side of the pipe main body 27 there is protrusively provided a connecting boss portion 33 which includes a fuel supply inlet 34 to be connected with a fuel supply pipe (not shown) from a fuel pump and also includes a fuel pressure sensor attachment socket 35 for attaching a fuel pressure sensor (not shown). The fuel supply inlet 34 and the fuel pressure sensor attachment socket 35 are all communicated with the fuel passage 26 through a passage 36. One end of both the fuel passage 26 and the passage 36 are respectively blocked with a blind plug 37 and 38.

Functional elements of the present embodiment thus constructed will be hereinafter described.

A fuel supplied to the fuel supply inlet 34 of the fuel delivery pipe 16 through a pipe from a fuel pump is distributed to the fuel injectors 9 of each cylinder by way of the fuel passage 26, and then directly injected into the combustion chambers 4 in accordance with a control signal from an engine control unit (not shown) connected to the connector 20 of each fuel injector 9.

The injector fixing bracket 14 of each fuel injector 9 as well as the fuel delivery pipe 16 are all fixed to common boss portions 19 of each cylinder head 1 with common bolts 18, so that it is possible to reduce the number of processing man-hours, the number of parts, and the number of assembling man-hours in a manufacturing process of the cylinder head 1.

Here, since the fuel passage 26 of the fuel delivery pipe 16 is disposed between the axis $L_1$ of each fuel injector 9 and the axis $L_2$ of each bolt 18, so that an interference reduction with other parts such as an intake port 2 is possible resulting in an efficiency in using the space within each cylinder.

On the outside of each fuel injector 9 there is disposed an fixing boss 31 of the fuel delivery pipe 16 wherein the boss 31 is positioned higher than the fuel inlet 28 of the fuel injector 9. Therefore, the fuel inlet 28 of the fuel injector is effectively protected by prohibiting the vicinity of the fuel inlet 28 from a direct contact with rainwater, dirt or lubricant.

Furthermore, the electric connector 20 of each fuel injector 9 is surrounded by the pipe main body 27, which forms the connecting portion 17 of the fuel delivery pipe 16, and two fixing boss portions 31, so that the electric connector 20 is effectively protected by prohibiting the vicinity of the electric connector 20 from a direct contact with rainwater, dirt or lubricant.

As described, with the fuel injector fixing structure for an in-cylinder injection type engine according to the present invention, since each fuel injector and the fuel delivery pipe are all fixed in the cylinder head with the common bolts, it is possible to reduce the number of processing man-hours and the number of parts as well as the number of assembling man-hours when manufacturing the cylinder head.

Further, with the fuel injector fixing structure for an in-cylinder injection type engine according to the present invention, since the fuel passage of the fuel delivery pipe may be disposed between the axis of each fuel injector and the axis of each bolt, it is possible for the fuel passage to reduce an interference with other parts such as an intake port, thereby increasing an efficiency in using the space within each cylinder.

Moreover, with the fuel injector fixing structure for an in-cylinder injection type engine according to the present invention, since each fixing boss portion of the fuel delivery pipe is positioned higher in its axial direction than a corresponding fuel injector, it is possible to protect the fuel injector with the fixing boss portion of the fuel delivery pipe.

In addition, with the fuel injector fixing structure for an in-cylinder injection type engine according to the present invention, since the electric connector of each fuel injector is surrounded by the fuel delivery pipe's connecting portion and two fixing boss portions, it is possible to protect the electric connector by virtue of the fuel delivery pipe's connecting portion and two attachment boss portions.

What is claimed is:

1. A fuel injector fixing structure for use with an in-cylinder injection type engine equipped with fuel injectors for directly injecting a fuel into cylinders, comprising:

at least one injector fixing bracket and a fuel delivery pipe for supplying a fuel to the fuel injectors, each injector fixing bracket and the fuel delivery pipe being secured to a boss portion of a cylinder head by a bolt corresponding to said at least one fixing bracket; and wherein an electric connector of each fuel injector is surrounded by a connecting portion of the fuel delivery pipe and two fixing boss portions corresponding to said each fuel injector.

2. A fuel injector fixing structure for use with an in-cylinder injection type engine according to claim 1, wherein a fuel passage of the fuel delivery pipe is disposed between an axis of each fuel injector and an axis of said corresponding bolt.

3. A fuel injector fixing structure for use with an in-cylinder injection type engine according to claim 1, further comprising a fixing boss portion having an opening for receiving said corresponding bolt disposed on a side of said fixing boss portion facing away from said fuel injector.

4. A fuel injector fixing structure for use with an in-cylinder injection type engine according to claim 2, further comprising a fixing boss portion having an opening for receiving said corresponding bolt disposed on a side of said fixing boss portion facing away from said fuel injector.

5. A fuel injector fixing structure for use with an in-cylinder injection type engine equipped with fuel injectors for directly injecting a fuel into cylinders, comprising:

at least one injector fixing bracket and a fuel delivery pipe for supplying a fuel to the fuel injectors, each injector fixing bracket and the fuel delivery pipe being secured to a boss portion of a cylinder head by a bolt corresponding to said at least one fixing bracket, further comprising a fixing boss portion having an opening for receiving said corresponding bolt disposed on a side of said fixing boss portion facing away from said fuel injector; and wherein an electric connector of each fuel injector is surrounded by a connecting portion of the fuel delivery pipe and two fixing boss portions corresponding to said each fuel injector.

6. A fuel injector fixing structure for use with an in-cylinder injection type engine equipped with fuel injectors for directly injecting a fuel into cylinders, comprising:

at least one injector fixing bracket and a fuel delivery pipe for supplying a fuel to the fuel injectors, each injector fixing bracket and the fuel delivery pipe being secured to a boss portion of a cylinder head by a bolt corresponding to said at least one fixing bracket;

a fixing boss portion having an opening for receiving said corresponding bolt disposed on a side of said fixing boss portion facing away from said fuel injector; and wherein a fuel passage of the fuel delivery pipe is disposed between an axis of each fuel injector and an axis of said corresponding bolt.

* * * * *